United States Patent
Braghiroli

(10) Patent No.: US 7,199,880 B2
(45) Date of Patent: *Apr. 3, 2007

(54) METHOD AND APPARATUS FOR OPTICALLY SCANNING A VEHICLE WHEEL

(75) Inventor: Francesco Braghiroli, Reggio Emila (IT)

(73) Assignee: Snap-On Equipment SRL a Unico Socio, Correggio (Reggio Emilia) (IT)

( * ) Notice: Subject to any disclaimer, the term of this patent is extended or adjusted under 35 U.S.C. 154(b) by 433 days.

This patent is subject to a terminal disclaimer.

(21) Appl. No.: 10/765,274

(22) Filed: Jan. 28, 2004

(65) Prior Publication Data

US 2005/0052658 A1    Mar. 10, 2005

(30) Foreign Application Priority Data

Sep. 4, 2003    (EP) .................................. 03020100

(51) Int. Cl.
*G01B 11/24* (2006.01)

(52) U.S. Cl. ......................................... 356/601; 73/146

(58) Field of Classification Search ........ 356/601–608; 73/146
See application file for complete search history.

(56) References Cited

U.S. PATENT DOCUMENTS 3,918,816 A * 11/1975 Foster et al. ................. 356/602
5,054,918 A    10/1991 Downing et al.
5,485,406 A *  1/1996 Wada et al. ................... 73/146
5,506,683 A     4/1996 Yang et al.
5,636,026 A *  6/1997 Mian et al. .................. 356/602
6,069,966 A     5/2000 Jones et al.
6,122,957 A     9/2000 Bux et al.
6,535,281 B2    3/2003 Conheady et al.
2002/0018218 A1* 2/2002 Conheady et al. .......... 356/602

FOREIGN PATENT DOCUMENTS

EP    0 565 320 A2    10/1993
EP    0 565 320 A3    10/1993

* cited by examiner

*Primary Examiner*—Richard A. Rosenberger
(74) *Attorney, Agent, or Firm*—McDermott Will & Emery LLP

(57) ABSTRACT

A method and apparatus for scanning a vehicle wheel rotatable about a measuring shaft of a wheel balancing machine. A light source scans the vehicle wheel by emitting a light beam onto the wheel surface, which is reflected and received by a receiver 11. The light source and the receiver are configured to move together with each other. An evaluation device is coupled to the receiver and a position sensor specifying the positions of the light source and the receiver. The evaluation device ascertains dimensions and positions of constituent parts of the vehicle wheel in a computer-aided procedure based on data obtained by the scanning process.

10 Claims, 1 Drawing Sheet

METHOD AND APPARATUS FOR OPTICALLY SCANNING A VEHICLE WHEEL

RELATED APPLICATIONS

This application is related to a co-pending patent application Ser. No. 10/765,207, titled "METHOD AND APPARATUS FOR OPTICALLY SCANNING A PNEUMATIC TIRE OF A VEHICLE WHEEL," filed concurrently herewith; a co-pending patent application Ser. No. 10/765,275, entitled "METHOD AND APPARATUS FOR BALANCING A MOTOR VEHICLE WHEEL," filed concurrently herewith; and a co-pending patent application Ser. No. 10/765,206, entitled "METHOD OF MATCHING A VEHICLE WHEEL," filed concurrently herewith. All of the applications are commonly assigned to the assignee of this application, and are incorporated herein by reference in their entireties.

FIELD OF THE DISCLOSURE

This disclosure concerns a method and apparatus for optically scanning a vehicle wheel, in particular a motor vehicle wheel, which is arranged with a stationary axis.

BACKGROUND AND SUMMARY OF THE DISCLOSURE

A method and apparatus for scanning the surface of the motor vehicle wheel by using a light beam emitted by a light source, and a position-sensitive receiver for detecting the reflected beam, are discussed in U.S. Pat. No. 6,535,281, titled "METHOD AND APPARATUS FOR OPTICALLY SCANNING A VEHICLE WHEEL," the entire disclosure of which is incorporated herein by reference. The spacing of the scanned location relative to a reference location is measured based on the directions of the emitted beam and the reflected beam, wherein the light source and the position-sensitive receiver pivot together about a common axis by means of a rotary drive for successive measuring steps.

This disclosure describes an improved method and apparatus for ascertaining geometrical parameters of the vehicle wheel and its constituent parts. A vehicle wheel is rotatably mounted to a stationary axis, such as a measuring shaft of a wheel balancer. The wheel is scanned by one or more light beams, such as laser beams. A light beam is directed from at least one given position onto the surface of the vehicle wheel. The light beam is then reflected by the vehicle wheel surface and received by at least one receiver installed at least one given position. Dimensions and/or positions of constituent parts of the vehicle wheel, such as the wheel disc portion, the rim, the rim flange or the pneumatic tire, are ascertained in a computer-aided procedure based on the direction of the emitted light beam and the reflected light beam.

The rim profile can be detected using the optical scanning operation on both side surfaces of the wheel. The type of wheel or the type of disc wheel portion can be ascertained based on a result of the scanning operation. In addition, the rim flanges as well as the material thickness of the wheel disc portion and the rim can also be determined using the scanning operation. Light beams are directed onto both sides of the vehicle wheel. The respective reflected beams are detected. One or more sensor devices including both a light source for emitting a light beam and a receiver for receiving the reflected beam are used. The light source and the receiver are arranged in such a way that the sensor can detect both sides of the vehicle wheel. Alternatively, two sensor devices may be provided, one for detecting the inside of the wheel and the other for detecting the outside of the wheel.

In addition, when scanning the rim from the rear side of the wheel and/or the outside of the wheel, whether one or more balancing weights are secured to the rim can be determined by the scanning process. The scanning process also determines the position of the respective balancing weight.

In one embodiment, the position, in particular the rotary angle position of a tire valve with which the pneumatic tire of the motor vehicle wheel is inflated, is detected by, for example, using the scanning process. That valve position may be used as a reference position (zero position) in a rotary angle detection procedure on the motor vehicle wheel.

In conjunction with detecting wheel spokes by using the optical light scanning procedure, the valve position can be used as a reference position for detecting the rotary angle positions of the various spokes on the motor vehicle wheel. The scanning procedure is performed to detect the positions and dimensions of the ends of the spokes at the rim. Knowledge of those positions and dimensions facilitates placement of the balancing weights behind spokes.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings, which are incorporated in and constitute a part of the specification, illustrate exemplary embodiments.

DETAILED DESCRIPTION OF THE DISCLOSURE

Figure 1:
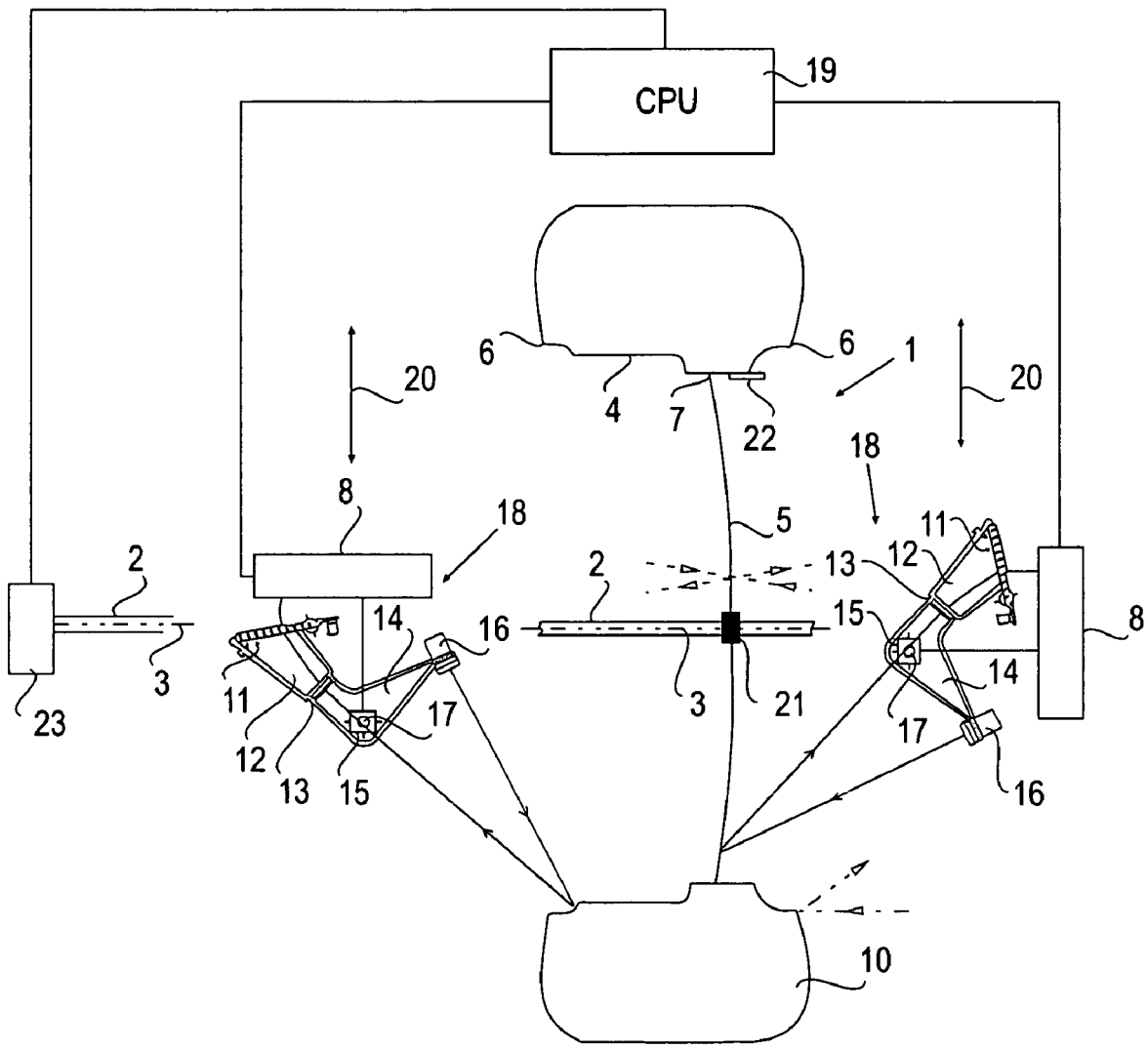
FIG. 1 depicts an exemplary system for scanning a motor vehicle wheel.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

FIG. 1 depicts an exemplary system for scanning a motor vehicle wheel. In FIG. 1, vehicle wheel 1 has a wheel disc portion 5 and a rim 4 fixed to the periphery of the wheel disc portion 5. A pneumatic tire 10 is mounted on the rim 4. Tire beads are supported in known manner at rim flanges 6 of the rim 4.

The vehicle wheel 1 is fixed to a measuring shaft 2 of a wheel balancing machine (not shown), and is rotatably supported about an axis of rotation defined by the measuring shaft 2. When the wheel is clamped in position in centered relationship, the rotation axis coincides with a wheel axis 3 to ensure that the wheel axis 3 is arranged in stationary relative to the wheel balancing machine.

The dimensions and positions of constituent parts of the vehicle wheel 1 can be measured with one or more sensor devices 18 and ascertained by using a computer. Each sensor device 18 includes a light source 16, such as a laser. In addition, each sensor device 18 includes a receiver 12, such as a CCD-sensor, as a position-sensitive receiving element. The light source 16 and the receiver 12 are fixed to a carrier 14. The carrier 14 is supported pivotably about a pivot axis 17. The carrier 14 can also be movably mounted linearly (double-headed arrow 19) or on a predetermined guide path with respect to the measuring shaft 2 and a fixing position 21 of the vehicle wheel 1 to the measuring shaft 2. The pivotal movement and the optionally additional linear or guided movement can be implemented by means of a drive (not shown), such as in the form of one or more stepping motors. A receiver optical system 13 is also provided on the carrier 14. The receiver optical system 13 and the CCD-sensor 11 are constituent parts of the receiver 12.

The light source 16 emits a light beam on to the surface of the vehicle wheel 1. The light is reflected by the surface and passes through the focusing receiver optical system 13 on to the sensor elements of the CCD-sensor 11. The CCD-sensor 11 can detect a plurality of local maxima of an illumination intensity function, separately from each other. The direction of the reflected beam depends on the distance of the location scanned on the vehicle wheel 1, with respect to the light source 16. Based on that distance, the reflected beam is directed by the receiver optical system 13 on to a given location of the CCD-sensor 11 and then converted into a position-sensitive or position-dependent signal. That signal is passed to an electronic measuring arrangement 8 coupled to a position sensor 15. The position sensor 15 supplies the electronic measuring arrangement 8 with position signals relative to the respective positions of the light source 16 and the CCD-sensor 11. The light source 16 and the receiver 12 move together with each other as they are fixed to the common carrier 14. The position signals are in reference to a reference position present on the machine (not shown), and thus are in reference to the positional relationships between and are in reference to the measuring shaft 2 mounted in stationary relative to the machine and the axial fixing position 21 at which the vehicle wheel 1 is fixed to the measuring shaft 2.

The electronic measuring arrangement 8 produces measurement signals corresponding to the positions of the surface locations of the motor vehicle wheel 1, which are scanned by the light beams emitted by the light source 16.

All surface points of the motor vehicle wheel 1 and in particular all surface points on the wheel disc portion 5 and the rim 4 can be detected by means of two sensor devices 18 that are associated with the inside of the motor vehicle wheel (left-hand sensor device 18 in the Figure) and the outside of the vehicle wheel 1 (right-hand sensor device 18 in the Figure). Examples of sensor devices 18 are described in U.S. Pat. No. 6,535,281, which is incorporated in this application by reference previously. It is however also possible to use only one sensor device 18 that can be moved into suitable measuring positions on a predetermined guide path both near the inside and the outside of the vehicle wheel 1.

In order to detect all surface spots of the vehicle wheel 1, the wheel 1 is mounted rotatably about the wheel axle 3 with the measuring shaft 2. The electronic measuring arrangement 8 that furnishes the corresponding measurement signals can be a constituent part of the respective sensor device 18, or integrated into an evaluation device 9 in the form of a computer. By virtue of the described measuring arrangement, dimensions and positions of constituent parts of the vehicle wheel 1 as well as properties of those constituent parts can be determined and evaluated by the evaluation device 9 in a computer-aided procedure.

By means of the described measuring arrangement, it is possible to communicate to the evaluation device 19 data related to locations scanned at the surface of the rim 4, from which the profile at the rim surface 4 can be determined. The profile of the rim provides locations at which balancing weights, for example adhesive weights, are to be attached when balancing the vehicle wheel 1. The inside rim surface is scanned by the left-hand sensor device 18 shown in the Figure. The rim contour can also be scanned at the outside of the wheel, in the same manner.

The shapes of the rim flanges 6 can be determined by using the same scanning process. The respective sensor device 18 is suitably positioned for that purpose and the light beam emitted by the light source is directed from different directions on to the respective rim flange, as shown in the Figure by dash-dotted lines at the bottom right-hand part of the outer rim flange. The profile or the shape of the rim flange can then be detected by pivotal movement and optionally straight movement, or movement guided in some other fashion, of the sensor device 18. The shape of the rim flange also affords a reference to the vehicle manufacturer. The service operator can then obtain indications about the choice of the balancing weights to be used, from the corresponding data bank.

It is also possible to measure the thickness of the wheel disc portion 5. For that purpose, the two opposite surfaces of the disc wheel portion 5 are scanned at, for instance, oppositely disposed locations disk wheel portion, as is shown by the broken-line illustrations. The thickness of the wheel disc portion 5 can be ascertained in the evaluation device 19 based on the information related to the positions of the mutually opposite surface locations which are sensed at the outside and the inside of the vehicle wheel 1.

The wheel type can be determined from the measured geometrical data related to the wheel disc portion 5 and the rim 6, and from the ascertained form of the rim flanges 6. The procedure provides information such as whether the wheel includes a disc wheel or has a rim of steel or of light metal.

It is also possible to detect the position of a tire inflation valve 22 when scanning the outside of the wheel, by means of the sensor device 18. The rotary angle position of the tire inflation valve 22 on the vehicle wheel 1 can be used as a rotary angle reference position, such as a zero position, when detecting the positions of spokes of the wheel disc portion 5. Detection of the rotary angular positions of spokes of the wheel disc portion 5 can also be performed with the sensor device 18. In that case, the light beam emitted by the light source 16 is directed on to the region of the end 7 of a spoke, at which the spoke or the wheel disc portion 5 is connected to the rim 4. The term 'spokes' is also used to determine parts of the wheel disc portion that extends from the wheel hub to the rim 4 and between which openings are provided in the wheel disc portion. Determining the rotary angle positions by means of the sensor device 18 is found to be advantageous in particular when fitting balancing weights behind spokes, as is described in U.S. Pat. No. 5,591,909, the disclosure of which is incorporated herein by reference by its entirety. The rotary angle position of the tire inflation valve 22 can also represent a reference position for a matching operation, that is to say turning the tire with respect to the rim 4 or the wheel disc portion 5.

The operation of detecting the rotary angular positions for the spokes and the tire inflation valve 22 is performed in conjunction with rotary angle signals that are delivered to the evaluation device 19 by a rotary angle sensor 23 coupled to the measuring shaft 2. The rotary angle sensor is connected to the measuring shaft 2 in a wheel balancing machine.

In addition, it is possible to determine the amount of needed balancing weights on the rim 4 and the position thereof, by means of the respective sensor device 18. Particularly, when dealing with wide rims, the above-described process avoids the risk that an operator may overlook the need to use balancing weights, particularly when changing a tire or when conducting measurement operations on the wheel disc portion.

The sensor device 18 that is used to scan the inside of the vehicle wheel is mounted pivotably to the machine frame of the balancing machine (not shown), as described in U.S. Pat. No. 6,535,281, which is incorporated in this application by reference previously. The sensor device 18 for scanning the outside of the vehicle wheel 1 (the right-hand sensor device 18 in the Figure) can be provided on a pivotable frame, in particular on a wheel guard hood (not shown) that is provided in known manner in a wheel balancing machine. In one embodiment, the sensor device 18 is mounted pivotably. It can also be mounted to the pivotable frame or the wheel guard hood displaceably linearly (double-headed arrow 20).

The method and apparatus discussed in this disclosure may be with any types of vehicle wheels, such as motor vehicle wheels, motorcycle wheels, trucks, buses, and the like.

The disclosure has been described with reference to specific embodiments thereof. It will, however, be evident that various modifications and changes may be made thereto without departing from the broader spirit and scope of the disclosure. The concepts described in the disclosure can apply to various operations of the networked presentation system without departing from the concepts. The specification and drawings are, accordingly, to be regarded in an illustrative rather than a restrictive sense.

What is claimed is:

1. A method of optically scanning a vehicle wheel rotatable about a stationary axis using a wheel balancing machine, wherein the wheel includes a rim and wheel disc portions, the method comprising the steps of:
   providing a first set of sensor devices, pivotally mounted to a frame of the wheel balancing machine, for scanning the inside of the wheel;
   providing a second set of sensor devices, fixed to a wheel guard hood of the wheel balancing machine, for scanning the outside of the wheel, wherein each set of the sensor devices includes a light source for emitting a light beam on to the surface of the wheel, and a receiver that moves together with the light source, for receiving a light beam reflected from the wheel surface;
   providing a position sensor configured to specify positions of the light sources and the receivers of the sensor devices; and
   determining dimensions and positions of constituent parts of the rim and the wheel disc portions of the vehicle wheel based on the respective directions of the at least one emitted light beam and the at least one reflected beam.

2. A method according to claim 1, wherein at least two mutually opposite surface locations, one on the inside of the wheel and the other on the outside of the wheel, are scanned, and the thickness of the wheel material is ascertained in a computer-aided procedure based on the positional data related to the scanned locations.

3. A method according to claim 1, wherein rim flanges are scanned and the shape or the profile of the respective rim flange is determined based on the scanned data.

4. A method according to claim 1, wherein the wheel type is based on the scanned data of the wheel constituent parts.

5. A method according to claim 1, wherein balancing weights needed to be fixed to the rim is detected by the scanning operation.

6. A method according to claim 1, wherein the rotary angle position of a tire inflation valve is detected by scanning the wheel surface.

7. A method according to claim 6, wherein the rotary angle position of the tire inflation valve is determined as a reference position for rotary angle positions on the vehicle wheel.

8. A method according to claim 6, wherein the rotary angle positions of wheel spokes, in particular in the region of the spoke ends which are connected to the rim, are detected.

9. An apparatus for optically scanning a vehicle wheel affixed with a stationary axis to a measuring shaft of a wheel balancing machine, wherein the wheel includes a rim and wheel disc portions, the apparatus comprising:
   a first set of sensor devices, pivotally mounted to a frame of the wheel balancing machine, configured to scan the inside of the wheel;
   a second set of sensor devices, fixed to a wheel guard hood of the wheel balancing machine, configured to scan the outside of the wheel, wherein each set of the sensor devices includes a light source for emitting a light beam on to the surface of the wheel, and a receiver that moves together with the light source, for receiving a light beam reflected from the wheel surface;
   a position sensor configured to specify positions of the light sources and the receivers of the sensor devices; and
   an evaluation device, coupled to the receivers and the position sensor, for
   ascertaining dimensions and positions of constituent parts of the rim and the wheel disc portions of the vehicle wheel using a computer-aided procedure based on the respective directions of the emitted beams and the reflected beams.

10. An apparatus according to claim 9, wherein the vehicle manufacturer is determined based on the scanned data related to the wheel constituent parts by accessing a data bank containing information related to the wheel constituent parts and associated vehicle manufacturer.

* * * * *